United States Patent

Seidel

[15] 3,656,831

[45] Apr. 18, 1972

[54] FEEDBACK AMPLIFIER

[72] Inventor: Harold Seidel, Warren, N.J.

[73] Assignee: Bell Telephone Laboratories, Incorporated, Murray Hill, N.J.

[22] Filed: Jan. 14, 1971

[21] Appl. No.: 106,510

[52] U.S. Cl. .................................330/85, 330/149, 330/151
[51] Int. Cl. ..........................................................H03f 1/36
[58] Field of Search ......................330/85, 149, 151; 333/12; 328/162, 163

[56] References Cited

UNITED STATES PATENTS 3,525,052 8/1970 Clark .....................................330/149

*Primary Examiner*—Roy Lake
*Assistant Examiner*—James B. Mullins
*Attorney*—R. J. Guenther and Arthur J. Torsiglieri

[57] ABSTRACT

A feedback amplifier is disclosed wherein two trifilar transformers are used to couple into and between a main signal amplifier and an error amplifier. The signal source is connected in series with one winding in the main amplifier transformer and one winding of the error amplifier transformer. A second winding of each transformer is connected, respectively, to the input port of its associated amplifier, while the output from each amplifier is connected to the third winding of the other's transformer. Advantageously, the input impedances of the main amplifier and the error amplifier are much less than the driving source impedance, while their output impedances are much greater than the source and load impedances. This permits the use of small, simple coupling transformers having very few turns. As a consequence, the resulting feedback network is exceedingly broadband, and the feedback delay correspondingly small.

6 Claims, 1 Drawing Figure

PATENTED APR 18 1972 3,656,831
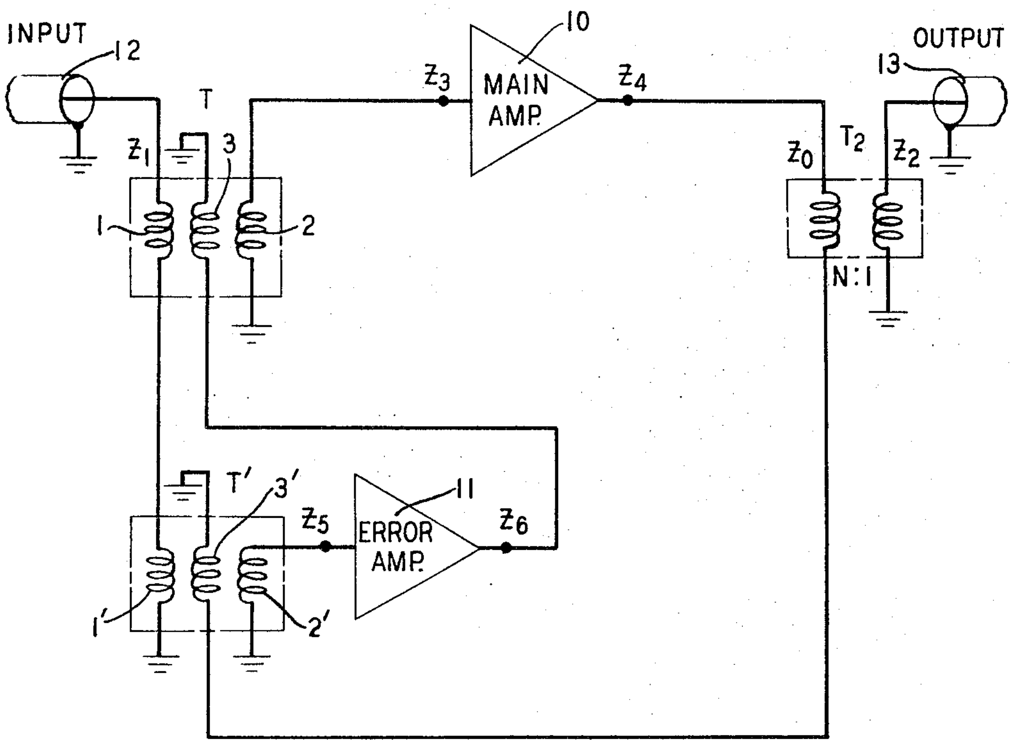
INVENTOR
H. SEIDEL
BY
[signature]
ATTORNEY

FEEDBACK AMPLIFIER

This invention relates to differential feedback amplifiers.

BACKGROUND OF THE INVENTION

In applicant's U.S. Pat. No. 3,471,798 he notes that the error-correcting technique known as feedback, which has been employed with much success, attempts a causal contradiction: after an event has occurred, feedback attempts to reshape the cause. Nevertheless, if the event is slow enough and if the feedback action fast enough, the feedback technique can be profitably employed.

The present invention, which is a modification of the feedback amplifier disclosed in applicant's copending application, Ser. No, 21,855, filed Mar. 23, 1970, and assigned to applicant's assignee, has as its object improvements in the feedback path. In particular, means for substantially reducing the transit time in the feedback circuit are described.

SUMMARY OF THE INVENTION

The feedback amplifier disclosed in applicant's above-identified application utilizes the input signal at least twice. In the first instance, the input signal is applied to the main amplifier and experiences the full amplifier gain. Secondly, the input signal is used as a reference against which the amplified output signal is compared. Any difference between the reference signal and the output signal, due to noise and/or distortion, is recognized as an error signal. The latter is amplified in a separate error amplifier, and then injected into the main amplifier in such a manner and phase as to degenerate the error.

In a feedback amplifier, in accordance with the present invention, two trifilar transformers are used to couple into and between the main amplifier and the error amplifier. Specifically, the signal source is connected in series with one winding in the main amplifier transformer and one winding of the error amplifier transformer. A second winding of each transformer is connected, respectively, to the input port of its associated amplifier, while the output from each amplifier is connected to the third winding of the other's transformer.

Advantageously, the input impedances of the main amplifier and the error amplifier are much less than the driving source impedance, while their output impedances are much greater than the source and load impedances. This permits the use of small, simple coupling transformers having very few turns. As a consequence, the resulting feedback network is exceedingly broadband, and the feedback delay correspondingly small.

It is a further advantage of the invention that the exclusive use of reactive coupling means preserves the low noise capability of the error amplifier.

These and other objects and advantages, the nature of the present invention, and its various features, will appear more fully upon consideration of the illustrative embodiment now to be described in detail in connection with the accompanying drawing.

BRIEF DESCRIPTION OF THE DRAWING

The drawing shows a differential feedback amplifier in accordance with the present invention.

DETAILED DESCRIPTION

In the drawing there is shown a feedback amplifier in accordance with the invention, comprising: a main amplifier 10; an error amplifier 11; a main amplifier input transformer T; an error amplifier input transformer T′; and an output transformer $T_2$. Input cable 12 is connected in series with winding 1 of transformer T and winding 1′ of transformer T′. Windings 2 and 2′ are connected, respectively, to the input ports of amplifiers 10 and 11, while windings 3′ and 3 are connected, respectively, to the output ports of amplifiers 10 and 11. More specifically, winding 3′ connects to amplifier 10 through the primary winding of output transformer $T_2$. The secondary winding of transformer $T_2$ is connected to output cable 13.

As indicated hereinabove, certain improvements are realized when the input impedances $Z_3$ and $Z_5$ and the output impedances $Z_4$ and $Z_6$ of amplifiers 10 and 11 are properly proportioned with respect to the signal source impedance $Z_1$. Specifically, input impedances $Z_3$ and $Z_5$ are one or more order of magnitude less than $Z_1$, while $Z_4$ and $Z_6$ are one or more orders of magnitude greater than $Z_1$. If, for example, $Z_1$ is a standard coaxial cable having a characteristic impedance of 50 ohms, these conditions are readily satisfied by transistor amplifiers connected in the common base configurations.

Because of the low impedance of amplifiers 10 and 11, low impedance transformers, with a minimum number of turns and low permeability can be efficiently used to drive the two amplifiers. This combination of low permeability and minimum number of turns, (low distributed capacitance) results in transformers of exceedingly wide bandwidth and correspondingly short transit time.

In operation, short circuit signal current flows through series connected windings 1 and 1′. The voltage induced hereby in winding 2 of transformer T drives the main amplifier 10, producing an output current which excites the primary of output transformer $T_2$ and winding 3′ of transformer T′. Winding 1′, which carries the input signal current and winding 3′, which carries the main amplifier output signal current, are excited such that the magnetic fields produced thereby are in opposition. In addition, the amplitudes of the magnetic fields are such that in the absence of any distortion, the resulting differential magnetic field is zero. In this case, no error voltage is produced in winding 2′, and no error correcting signal is fed back to the main amplifier.

More generally, however, a difference magnetic field will be produced due to the noise and/or distortion introduced by the main amplifier 10. This difference field will, in turn, induce an error signal in winding 2′ which is amplified by the error amplifier and coupled to winding 3 of transformer T. Winding 3 is excited such that the error signal thus fed back cancels the distortion introduced in the first instance by the main amplifier. Attenuating and phase adjusting means, not shown, are included, where required, to effect the necessary current amplitude and phase conditions described hereinabove.

The simplest arrangement is arrived at by using transistors connected in the common base mode. Since the current gain for this configuration is approximately unity, transformers having 1:1:1 turns ratios can be used. With amplifiers having different current gains, the transformer turns ratios would have to be adjusted accordingly. The turns ratio N:1 of output transformer $T_2$ is, of course, dictated by the desired gain which, in turn, defines the magnitude of the reflected load impedance $Z_0$. That is $N = \sqrt{Z_0/Z_2}$, where $Z_0 << Z_4$.

It is apparent that multiple feedback loops, as explained in the above-identified copending application, can be devised in accordance with the present invention. Thus, in all cases it is understood that the above-described arrangement is illustrative of but one of the many possible specific embodiments which can represent applications of the principles of the invention. Numerous and varied other arrangements can readily be devised in accordance with these principles by those skilled in the art without departing from the spirit and scope of the invention.

I claim:

1. A feedback circuit for coupling electromagnetic wave energy having an input circuit and an output circuit, comprising:
   - a main signal amplifier;
   - an error amplifier;
   - a first trifilar transformer for coupling into said main amplifier;
   - and a second trifilar winding for coupling into said error amplifier;

characterized in that:
   - said input circuit is connected in series with a first winding of each of said transformers;
   - a second winding of each of said transformers is connected, respectively, to the input end of each of said amplifiers;

and the third winding of each of said transformers is connected, respectively, to couple the output end of one of said amplifiers to the input end of the other of said amplifiers.

2. The circuit according to claim 1 wherein the input impedance of each of said amplifiers is at least an order of magnitude less than the impedance of said input circuit, and the output impedance of each of said amplifiers is at least an order of magnitude greater than the impedance of said input circuit.

3. The circuit according to claim 1 wherein said amplifiers have unity current gain and wherein said transformers have 1:1:1 turns ratios.

4. The circuit according to claim 1 including an output transformer for coupling between the output from said main amplifier and said output circuit.

5. The circuit according to claim 4 where the main amplifier load impedance is an order of magnitude less than the output impedance of the main amplifier.

6. The circuit according to claim 1 wherein the first winding and the third winding of said second transformer are excited such that the magnetic fields produced thereby are in opposition.

* * * * *